United States Patent [19]

Millard

[11] 4,020,490
[45] Apr. 26, 1977

[54] TRAFFIC RADAR AND APPARATUS THEREFOR

[75] Inventor: Keith Millard, Decatur, Ill.

[73] Assignee: Decatur Electronics, Inc., Decatur, Ill.

[22] Filed: Nov. 20, 1974

[21] Appl. No.: 525,477

[52] U.S. Cl. .............................. 343/8; 324/78 D; 324/79 D; 331/14
[51] Int. Cl.² ................... G01S 9/44; G01R 23/14
[58] Field of Search ............ 343/7 A, 8; 324/78 R, 324/78 D, 79 D; 331/14; 328/140; 307/233 R

[56] References Cited
UNITED STATES PATENTS

| | | | |
|---|---|---|---|
| 3,077,594 | 2/1963 | McKay et al. | 343/8 |
| 3,438,031 | 4/1969 | Fathauer | 343/8 |
| 3,594,655 | 7/1971 | Reisfeld | 331/14 |
| 3,715,751 | 2/1973 | Mead | 343/8 |
| 3,721,977 | 3/1973 | Darboven | 343/7 A |
| 3,885,238 | 5/1975 | Klein et al. | 343/7 A |

Primary Examiner—Maynard R. Wilbur
Assistant Examiner—S. C. Buczinski
Attorney, Agent, or Firm—Neuman, Williams, Anderson & Olson

[57] ABSTRACT

Apparatus is provided for determining the frequency of unknown periodic input signals and primarily generally sinusoidal signals which may be accompanied by substantial noise. More particularly a unique traffic radar or doppler radar is provided employing such frequency measuring apparatus. The apparatus includes a phase locked loop in which a frequency multiplier effect is produced and in which a frequency 12 times the periodic input signal being subjected to measurement is employed for taking two independent samples of the input signal and providing a synthetic representation of that signal. The two samples are centered about quadrature time references and are preferably conterminous. This signal can be measured and utilized for speed measuring purposes and other purposes where the accurate measurement of a periodic signal accompanied by noise is desired. The system includes two sampling gates to control the frequency of a variable controlled oscillator in a manner which accurately matches the oscillator output to a harmonic of the input and selects portions thereof to eliminate harmonic ambiguities. Circuit means is also provided for signal verification and for improved long-term noise rejection by utilizing variable time constants.

19 Claims, 4 Drawing Figures

4,020,490

TRAFFIC RADAR AND APPARATUS THEREFOR

BACKGROUND OF THE INVENTION

Traffic and other doppler radar have been known for many years. The typical traffic radar employs a high-frequency source of electrical energy which is transmitted as a beam in the direction of a vehicle and the reflected signal from the vehicle is passed through a detector and duplexer which produces an output audio signal. This signal is equal to the frequency difference between the transmitted and received signal. This frequency difference is representative of the speed of the vehicle in accordance with the wellknown doppler principle. Typical of the prior art doppler radar systems is that disclosed in U.S. Pat. No. 3,438,031.

The basic principle upon which a stationary CW doppler radar operates is set forth in the following wellknown equation:

$$F_d = 2v/c \, f_t$$

Where $F_d$ is the doppler frequency
$f_t$ is the transmitted frequency
$v$ is the target velocity
$c$ is the speed of light This equation assumes that the vehicle is headed on a radial path directly toward or away from the transmitter. A typical nominal transmitter frequency used in radar of this kind is $10.525 \times 10^9$ Hz and the doppler frequency $F_d$ in Hertz as a function of target velocity, $v$, in miles per hour is then:

$$F_d \, (Hz) = 31.389 \, v \, (mph)$$

Thus, for speeds from zero to 400 miles per hour, the doppler signal $F_d$ is within the audio range of roughly 0 to 12 kHz. Throughout this specification the $10.525 \times 10^9$ Hz transmitter frequency will be assumed in discussing speeds, time intervals, doppler frequency-speed analogs and the like.

Doppler radar systems of the type described herein generate an audio signal which is normally accompanied by substantial noise and spurious energy. Thus, the detection and measurement of the doppler signal is frequently difficult and subject to substantial error. The prior art radar has failed to fully solve the problem of noise and measurement accuracy with optimum sensitivity. Furthermore, the frequency range which must be covered is about 0 to 12 kHz and circuits capable of operating over this range have been generally complex and expensive.

SUMMARY OF THE INVENTION

The apparatus provided by this invention for determining the frequency of an unknown periodic input signal utilizes phase locked loop technology to provide enhanced noise immunity, freedom from harmonic ambiguity and an inexpensive method of accurately determining audio frequencies over a wide range for uses such as doppler radar. The invention employs an effective frequency multiplier circuit in which the zero crossover of a periodic signal is utilized as a control for a voltage controlled oscillator (VOC) operating at approximately 12 times the principal input frequency.

A duodecimal counter provides up to 12 independent output channels, any one of which will provide a signal equal to the frequency of the doppler input and various of the 12 output channels are utilized to control a sampling system which will automatically detect the crossover of the input signal for automatic frequency control purposes as well as the polarity and magnitude of an adjacent signal sample for purposes of avoiding harmonic ambiguity and for verification. The use of a duodecimal counter is not absolutely required to obtain the benefits of the invention. A six count counter can be used, or perhaps higher base counters provided that the center of the crossover sample is in quadrature with the center of the verification sample. The larger the samples are, the higher will be the freedom from harmonic ambiguity and if the two samples are conterminous there is no ambiguity. Additional circuitry is provided for the automatic control of the response time of the system in order to improve the initial operation of the phase locked circuit while providing long term noise immunity.

This system is combined in a doppler radar system including signal verification, control of digital storage, data latching and read out in response to the verification information.

THE DRAWINGS

For a more complete understanding of this invention, reference will now be made to the accompanying drawings, wherein:

FIg. 4 is a schematic time diagram of the timed pulses for determining the sampling interval for speed measurement.

THE DOPPLER RADAR

Figure 1:
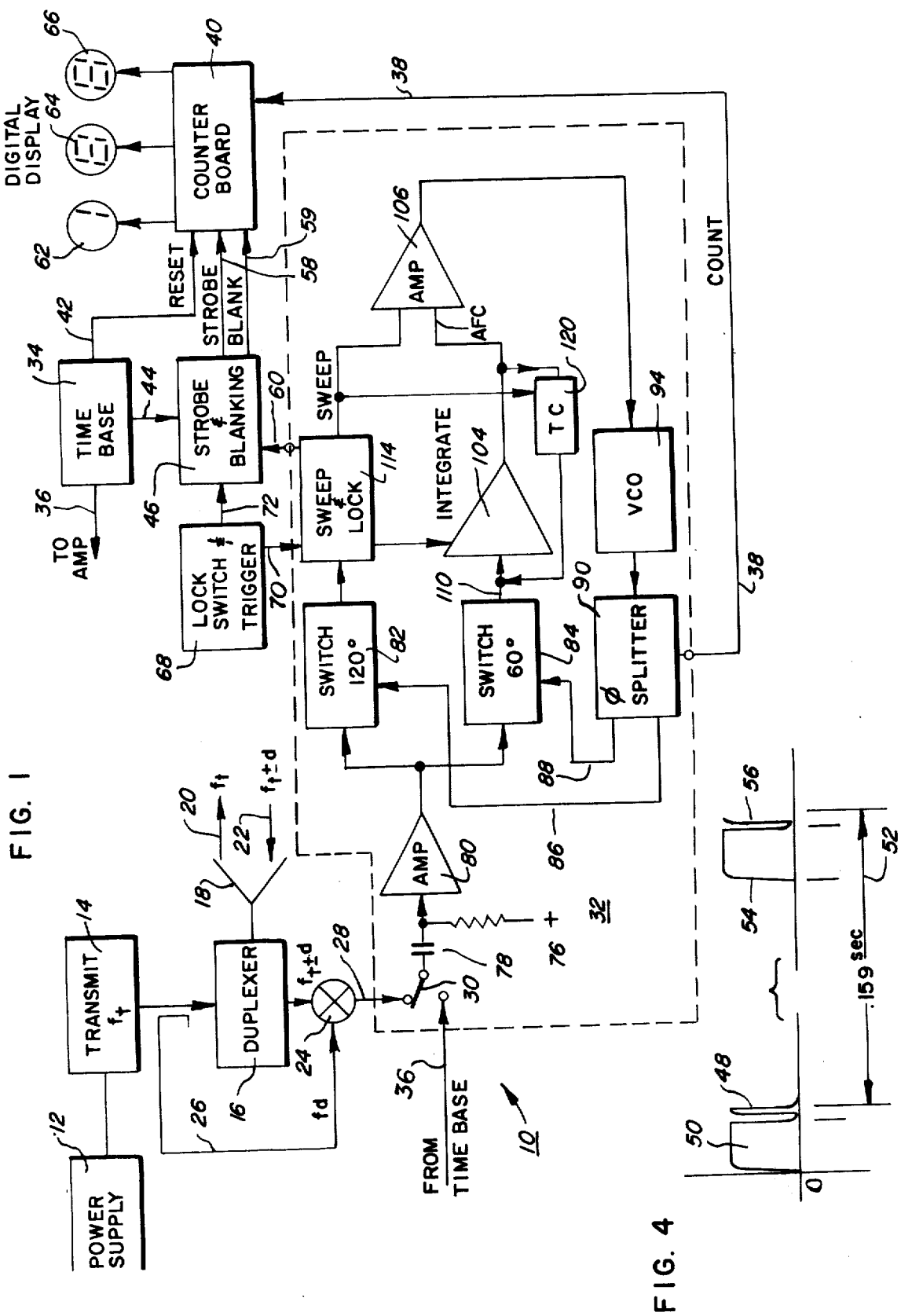
FIG. 1 is a block diagram of a doppler radar incorporating the unique frequency determining circuit of this invention.

Referring now to the drawings and more particularly to FIG. 1, a block diagram of a complete doppler radar with digital display is shown. The basic elements of such a doppler radar 10 comprise a power supply 12 which provides power for all of the circuits including a transmitter 14 which generates a constant wave (CW) signal in the microwave region $f_t$. In the example described in detail the transmitter frequency is 10.525 gHz. The signal from transmitter 14 is applied through a duplexer 16 to an antenna 18 which transmits a finely focused collimated beam of energy indicated by the arrow 20. The energy is reflected off of a target and returned to the antenna 18 and if the target is in motion toward or away from the antenna 18 the frequency of the reflected signal is $f_t \pm d$ as indicated adjacent arrow 22.

The reflected signal $f_t \pm d$ is received by antenna 18 and applied to duplexer 16 which in turn applies the signal to a mixer 24. The mixer 24 is also fed with a portion of the energy from transmitter 14 through the shunt coupler 26 and, by conventional mixing techniques well known in the art, the mixer 24 produces an output signal 28 having a frequency $d$. When the selector switch 30 is in the position shown doppler signal $d$ is applied directly to the input of the verification system 32 enclosed in broken lines. When the switch 30 is thrown to the lower position as illustrated in FIG. 1, the output of a standard frequency generator representing 60 mph contained within the time base system 34 is applied to the input of the verification system 32 through input 36.

Whether the switch 30 is in the upper position to receive the doppler signal through conductor 28 or in the lower position to receive the 60 mph standard frequency from conductor 36, the input to the verification system 32 is processed to generate at the output 38 a clean, relatively noise free frequency or series of pulses equal to the input frequency at the switch 30. The details of this signal processing will be described in greater detail below.

The output signal on conductor 38 is applied to a counter board 40 which contains an input circuit which divides the count by 5 to produce a signal having a frequency such that each count during a preset time base interval will represent one mph of vehicle speed. The output of the divide-by-5 circuit in counter board 40 is fed to three serially connected decade counters in a conventional manner to store from 0 to 999 counts therein in binary form. This storage is accomplished in a completely conventional manner.

The divide-by-5 input circuit of counter board 40 as well as each of the three serially connected decade counters may be a conventional integrated circuit such as the TTL/MSI 7490 decade counter which includes conventional input, output and reset connections. The reset connection for the divide-by-5 and the three decade counters is energized from an output 42 of the time base circuit 34.

The time base circuit 34 contains a conventional 205.710 kHz crystal controlled oscillator and integrated circuits for dividing that frequency down to 6.277 Hz. The 6.277 Hz signal is applied to a monostable multivibrator such as a TTL/Monostable 74121 integrated circuit which with an appropriate capacitor produces an output pulse of 15 used in response to each positive going edge of the output of the divider circuitry. This 15 usec pulse is the strobe pulse applied through conductor 44 to the strobe and blanking circuit 46 which will be described in greater detail below. The 15 usec strobe pulse is also applied to a second monostable multivibrator such as a 74121 with an appropriate capacitor generate a second output pulse in response to the trailing edge or end of the strobe pulse. The second or reset pulse has a duration of 1.5 usec and is applied through the reset conductor 42 to the reset terminals of the divide-by-5 circuit and the three decade counters. Each time a reset pulse is applied from the time base circuit 34 through conductor 42 to the divide-by-5 circuit and decade counters, a new count is commenced in response to pulses applied to the counter board 40 through conductor 38 and the count continues until the next reset pulse arrives.

The time base circuit 34 also includes a 241.07 kHz crystal oscillator system and divider circuitry to produce an output on connection 36 having a frequency of 1,883.3 Hz in the particular embodiment described. From the doppler frequency-velocity relationship set forth above it will be immediately apparent that the output on conductor 30 of 1,883.3 Hz represents a vehicle travelling in the direction of or away from the antenna at a rate of 60 mph (31.389 × 60 = 1883.3). This is utilized to test the system.

The timing of the reset pulses is illustrated in the pulse diagram, FIG. 4, a first reset pulse 48 is illustrated following a first strobe pulse 50 with pulse amplitude plotted along the ordinate and time plotted along the abscissa beginning from the apex 0. The strobe pulse 50 is diagrammatically shown as having a 15 usec duration followed by a reset pulse 48 having 1.5 usec duration. The interval between pulses is the reciprocal of 6.277 Hz or 0.159 seconds as shown by the arrows and legend 52 on FIG. 4. A second strobe pulse 54 and a second reset pulse 56 are also illustrated.

The strobe and reset pulses would occur in the same sequence every 0.159 seconds whereby the count accumulated in the three digit counters contained in counter board 40 is equal to the number of cycles or pulses appearing on conductor 38 during a 0.159 second interval divided by 5. As stated above, the various frequencies and time intervals referred to herein all relate to the preferred embodiment of the invention utilizing a 10.525 gHz transmitter frequency. Thus, in this embodiment the doppler difference frequency at conductor 28 equals 31.389 Hz for each mile per hour of vehicle velocity along a radial from the antenna. Therefore, the time interval of 0.159 seconds (6.277 Hz) for a count in the counter board 40 as shown in FIG. 4 contemplates 5 doppler cycles to be generated for every mile per hour of target velocity. However, the counter board 40 includes an initial input circuit which divides the count on conductor 38 by 5 whereby each pulse applied to the three serial decade counters represents 1 mile per hour.

Figure 3:
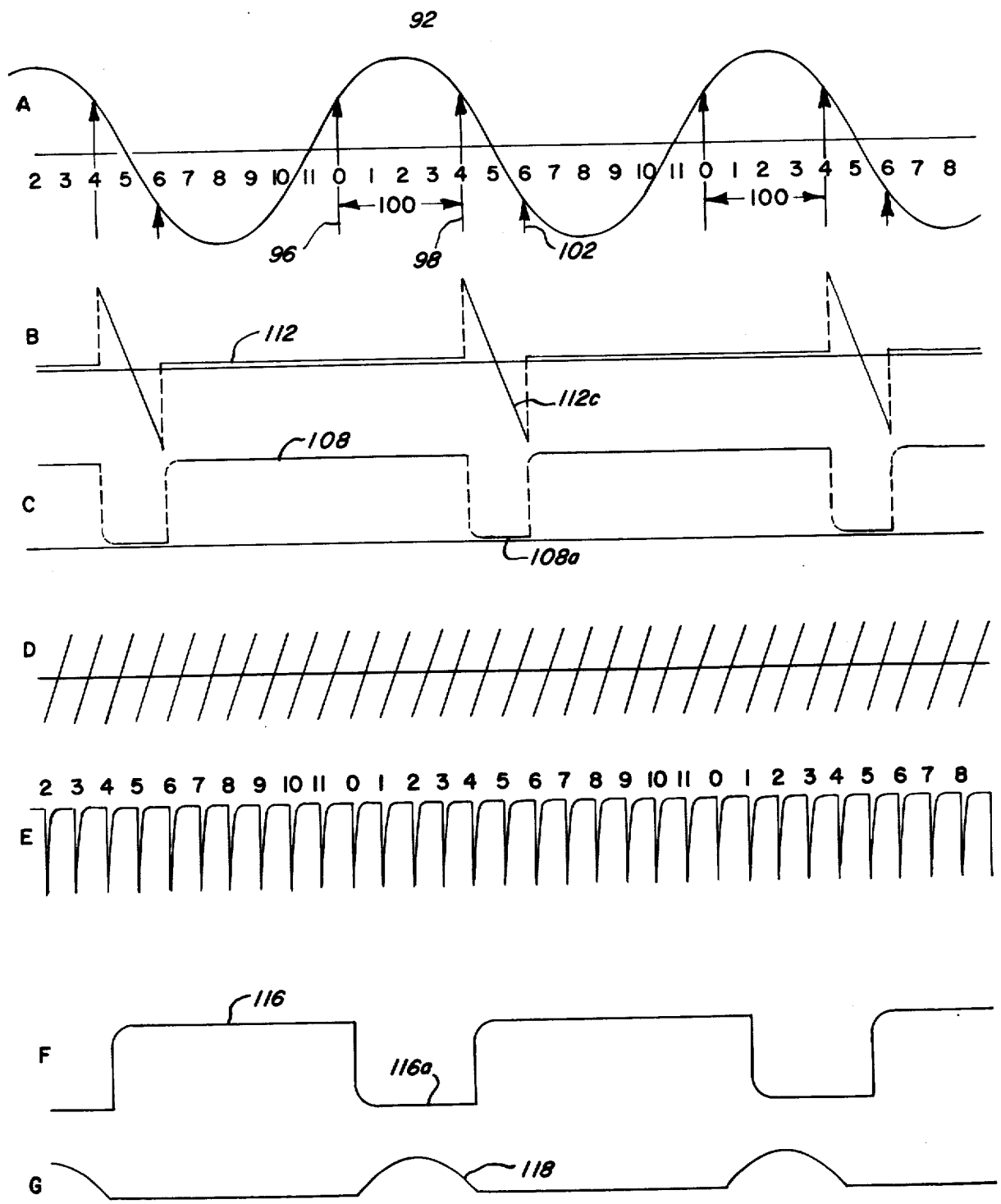
FIG. 3 is a group of phase and signal diagrams on a common time base.

The use of a divide-by-5 stage prior to feeding the three decade counters eliminates any requirement to synchronize the time base generator 34. Thus, no synchronization between the sampling timing shown in FIG. 4 and the verification timing shown in FIG. 3 is necessary. The divide-by-5 circuit provides accuracy of +0.2, −0.8 mph.

The three decade counters are connected in parallel to three latch circuits of a conventional type. A typical integrated latch circuit satisfactory for this purpose is the 4-bit latch TTL/MSI 7475. The transfer of the pulse count from the three decade counters to the three latches is controlled by the 15 usec strobe pulse applied through conductor 58 to the standard pins for clock input latches on the 7475. The strobe pulses such as pulses 50 and 54 shown in FIG. 4 are applied from the time base circuits 34 through conductor 44 to the strobe and blanking circuit 46 where a verification signal from the verification board 32 is applied through conductor 60 to control the transfer of the strobe pulses from conductor 44 to the output conductor 58 and in turn the latches in control board 40.

The verification circuit 32 generates a control signal at the output 60 whenever a signal of adequate strength at conductor 28 is verified through the verification circuit 32 which will be described in greater detail below. When a signal has been verified the signal on conductor 60 permits the strobe pulse to transfer the count from the three decade counters to three parallel connected 7 segment decoders such as integrated circuits 7447.

As indicated in FIG. 4, the strobe pulses 50 and 54 immediately precede the reset pulses 48 and 56. However, the strobe pulse cannot be transferred from the time base circuits 34 through conductor 44 to conductor 58 and the counter board 40 unless the signal from the verification board 32 through conductor 60 indicates that a verified reliable signal within the prescribed frequency range has been processed. In the event the strobe pulse causes the counts stored in the three decase counters to be transferred by the latch circuits and registered in the 7 segment decoders forming the controls for the 7 segment displays 62, 64 and 66. The 7 segment decoders are standard TTL integrated circuits 7447 which control the 7 segment display tubes such as tubes DR 2100. The operation and connections for the entire counter board are completely conventional and are also prescribed by the manufacturers of the components mentioned and thus not shown or described in greater detail.

A manual lock switch and trigger circuit 68 involves conventional solid state logic and provides an output 70 to control the generation of a verification signal as well as an output 72 to control the strobe and blanking circuit 46. The lock switch and trigger circuit has a manual control so that the operator of a traffic radar may at his option actuate a switch to lock and hold a reading on the digital display 62, 64 and 66 or blank the display completely. As will be described in greater detail below, this operation merely provides a signal on conductor 70 which disables the verification signal circuit contained in the verification board 32 so that a verification signal cannot be obtained on conductor 60 which would activate the strobe and blanking circuit 46 to permit subsequent readings to be displayed on the digital display. The blanking output 59 is also activated which is directly applied to a blanking input on each of the 7 segment decoders to prevent a visual display. Thus, upon actuation of the appropriate controls, an operator can hold the speed indication which he desires on the digital display or blank it completely.

Furthermore, the lock switch and trigger circuit 68 provides an output 72 to the strobe and blanking circuit so that unless the operator has actuated the appropriate control in the circuit 68 no readings will appear on the digital display 62, 64 and 66.

VERIFICATION CIRCUITRY

As shown in block form in FIG. 1, described hereinafter in conjunction with the wave forms of FIG. 3, the selected input from switch 30 is applied through a network comprising series capacitor 78 and resistor 76 to an operational amplifier 80. The output of operational amplifier 80 is fed to two solid state switches 82 and 84 to select only predetermined portions of the total wave form or signal period. The particular portion of the input signal selected by the switches 82 and 84 is determined respectively by a control signal on conductor 86 for switch 82 and conductor 88 for switch 84, both of these control signals being taken from a phase splitter 90.

A typical input signal such as for example a 2,000 Hz doppler signal is illustrated as wave form A in FIG. 3. Wave form 92 represents the complete doppler signal which may be accompanied by substantial noise and be very difficult to accurately count for purposes of speed determination. Thus, the verification circuit 32 utilizes only portions of the complete wave form 92 to generate a synthetic wave form from the variable controlled oscillator 94 and this synthetic wave form is utilized in the phase splitter 90 to control the two switches 82 and 84 and also provide the output count in conductor 38 which controls the digital displays 62, 64 and 66.

The portions of the input wave which are utilized in the preferred embodiment are a 120° sample segment lying between the 0 arrow 96 and the 4 arrow 98 to provide a sample time 100 equal to 120° of the complete 360° periodic cycle as shown in curve A of FIG. 3. The switch 84 takes a conterminous time sample between the 4 arrow 98 and the 6 arrow 102 and this sample constitutes a 60° segment of the complete periodic signal.

The system of this invention generates a synthetic signal in the VCO 94 which, when locked, is 12 times the doppler signal appearing at the input to amplifier 80. The phase splitter 90 uses this duodecimal harmonic for the various purposes described above and hereinafter.

The 60° switch 84 provides a signal sample to integrator 104 and a variable D.C. voltage generated therein is in turn applied to a dual input operational amplifier 106. Thus, if the 60° sample of the input signal applied to integrator 104 is either positive or negative, a signal is applied through amplifier 106 to VCO 94 which will tend to respectively increase or decrease the frequency output of VCO 94 to phase splitter 90 to eliminate the error voltage. When that error voltage is close to 0 the input doppler signal will be related to the twelve counts of the phase splitter as shown in curve A of FIG. 3 and will transition through the 0 access at the 5 count and this will constitute a phase null. The switching voltage from phase splitter 90 appearing on conductor 88 and applied to switch 84 is shown as curve 108 in FIG. 3c and as will be seen, the signal on conductor 88 turns on switch 84 when that signal goes to near 0 for the 60° period indicated by curve portion 108a. When the circuit is producing a null, the output switch 84 appearing on conductor 110 will be shown in curve 112 of FIG. 3b. As can be seen from that figure, when the curve portion 112a includes equal positive and negative portions, the average value will be 0 and the circuit will be in a phase locked condition. In this circumstance the output of the VCO 94 is precisely 12 times the input doppler signal at switch 30 and the phase splitter 90 divides the VCO output by 12 producing in output conductor 38 a synthetic signal which produces an output pulse for each doppler cycle. When this is counted it gives a precise indication in the digital display of the speed of the vehicle being observed.

The length of the AFC controlling sample is not critical although the advantages of the 60° sample will be manifest, a lesser sample, say 30° or 40° would produce less stability and greater sample intervals up to a limit of 180° would produce diminishing response time because of the flattening shape of the sinusoid. The duty cycle of the AFC sample is preferably substantially less than 180° or 50%.

Because of the extensive range of the phase lock loop described above (approximately 0 to 144 kHz), a second control circuit is provided in which a sweep generator 114 generates a gradually increasing voltage over a period of approximately 0.4 second which is also applied to operation amplifier 106. Thus, the output of the integrator 104 will act much faster than the output of sweep and lock circuits 114 but the combination will prevent the possibility of the system locking in on anything but the fundamental doppler frequency. The output of sweep generator 114 is added to the output of integrator 104 and applied to amplifier 106. The sweep generator is providing a continuously varying signal to the amplifier 106 at all times unless a positive voltage of predetermined magnitude is applied to the sweep generator control from the 120' switch 82. If the phase lock loop is operating at any frequency other than the input fundamental an inadequate signal will be applied from switch 82 to sweep generator 114. When the VCO 94 is at the input frequency and in phase, the signal sample from switch 82 will be the segment 100 shown in curve A of FIG. 3 and this positive sample will disable the sweep generator 114 and permit the phase lock loop to lock on the input fundamental. The signal applied to switch 82 from conductor 86 when the PLL is locked is shown in FIG. 3f as curve 116 and it can be seen from FIG. 3f that when the signal 116 applied through conductor 86 to switch 82 goes to 0 in segment 116a, the switch is enabled. The output of switch 82 is diagrammatically shown in FIG. 3g including the output positive hump 118 which is integrated to control the VCO as well as the strobe and blanking.

In order to quickly lock onto an input signal and verify it, the time constant of the integrater 104 is relatively short during the acquisition period and this time constant is controlled by the TC circuit 120 shown in FIG. 1. Once the input signal is verified by the circuit 32 the TC circuit 120 is adjusted by a signal from the sweep and lock circuit 114 through conductor 156 to provide a longer time constant and enhanced noise immunity in the mode of operation following signal acquisition.

DETAILED DESCRIPTION OF VERIFICATION

Figure 2:
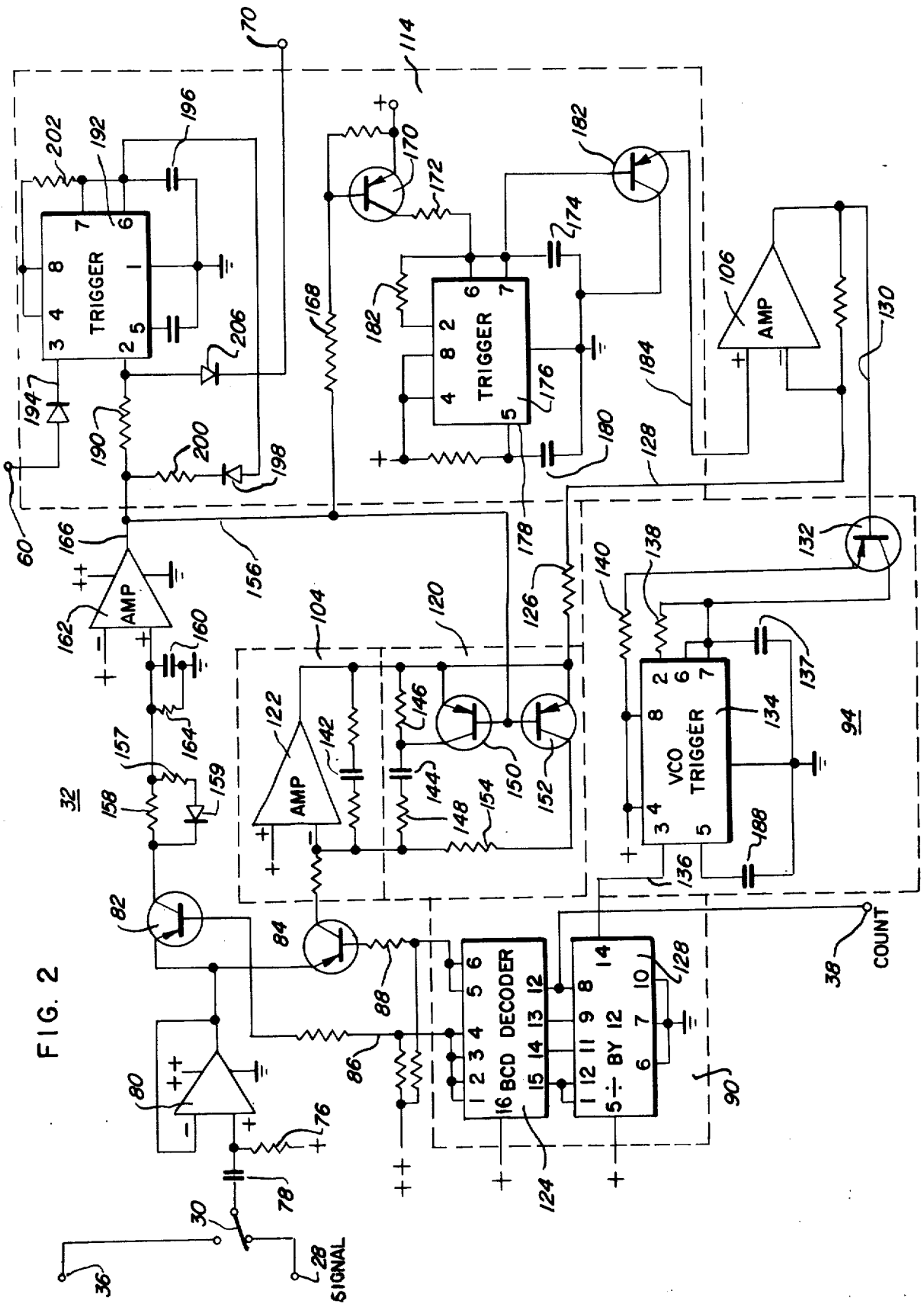
FIG. 2 is a circuit diagram of the phase locked loop and related verification circuitry of this invention.

Referring to FIG. 2, the verification circuit system 32 is illustrated with the input 36 for the 60 mph calibration signal and the input 28 from the mixer 24 shown connected to the input switch 30. The count output 38 which actuates the counter board 40 is shown at the bottom of FIG. 2 while the output 60 to the strobe and blanking circuit is shown at the top of FIG. 2. The control input 70 from the lock switch and trigger circuit 68 is shown at the right.

The functional operation of the verification board 32 has already been described and the components which satisfy those functions are shown in detail in FIG. 2. The system utilizes a plus 5 volt reference voltage throughout and especially in conjunction with the various operational amplifiers and this plus 5 volt reference is referred to with a single plus sign throughout FIG. 2. A supply voltage of approximately 10 volts is utilized on the various amplifiers and other circuits and this is designated with a double plus sign. All references to voltages or signals on the various operational amplifiers as either being high or low or positive or negative is with reference to this 5 volt level.

The input doppler signal is applied through switch 30 and the network comprising capacitor 78 and resistor 76 to the operational amplifier 80. The output of amplifier 80 is applied to transistor switch 84, the output of which is applied to an integrating operational amplifier 122. As already described above, the switch 84 is turned on by the output of the phase splitter 90 which includes BCD decoder 124 through the conductor 88 so that the switch grounds the base of transistor 84 during two of twelve counts or 60° of the input cycle turning on transistor 84. BCD decoder is conventional and connected in the conventional manner. A TTL 74145 integrated circuit functions well for this purpose.

The 60° sample is applied through amplifier 122 to the summing amplifier 106 through resistor 126 and conductor 128 and the output of operational amplifier 106 is applied through conductor 130 to a transistor 132 which forms a part of the variable controlled oscillator 94. The oscillator also includes the integrated circuit 134 which may be an LM 555 timer available from National Semiconductor and others. The output of the timer 134 is applied through conductor 136 to a divide-by-12 integrated circuit 138 which may for example be a TTL 7492, a 4bit binary counter. The outputs of the 4-bit binary counter are applied in a conventional parallel manner to a 4-bit BCD decoder 124. The most significant digit output of counter 138 is applied to the count output 38 to provide the synthetic doppler signal when the verification circuit indicates a phase locked condition. The first four outputs of the BCD decoder 124 are connected in parallel and in turn connected to the conductor 86 and thus the base of switch 82 is grounded through the decoder 124 and switch 82 is on for the first four of twelve counts. As shown in FIG. 2, for the next two counts of the decoder 124 the conductor 88 is connected to ground. For the balance of the 12 counts, the bases of both switches 82 and 84 are ungrounded and the switches remain open. Thus, there is no other output from the BCD decoder 124.

The frequency of the VCO circuit including timer 134 is determined by the time constant of the input circuit including capacitor 137 and resistor 140 in series with the emitter-collector path of transistor 132. The timer 134 functions as a relaxation oscillator and if the output at output conductor 136 is at twelve times the frequency and synchronized with the doppler signal at switch 30, the conductivity of transistor 132 is stabilized and the output of integrating amplifier 122 is effectively 0. If the output of amplifier 122 indicates that the sample of the input signal taken by switch 84 is other than a sample balanced around the transition through the 0 axis as shown in FIG. 3a, a positive or negative signal at the output of amplifier 122 will be applied to the inverting input of amplifier 106 rendering the base of the transistor more negative or positive and thus increasing or decreasing the conduction in transistor 132 respectively. This puts respectively less or more effective resistance in parallel with resistor 138 and thereby adjust the frequency of the relaxation oscillator to produce a phase locked relationship.

The response time of the integrating amplifier 122 is controlled by the feedback network comprising capacitors 142 and 144. During the acquisition mode before the system is in phase lock, capacitor 144 is considerably larger than capacitor 142 but is effectively removed from the circuit by series resistor 146 thus providing a relatively small capacitance and fast response time in the integrating amplifier 122. Resistor 154 is connected in series with transistor 152 across the capacitor 142 and provides shunting for the capacitor and consequently limits the D.C. gain.

When a verified signal has been established, however, the signal at conductor 156 rises from a negative value turning on transistor 150 and turning off transistor 152. Thereby resistor 146 is effectively bypassed increasing the total capacitance in the feedback network of integrator 122 and resistor 154 is effectively removed from the circuit providing an essentially infinite amount of integration. This produces a relatively slow response to changes in input signal but produces greatly enhanced noise immunity. It also guarantees that the time interval between 98 and 102 in FIG. 3a is centered about the reference. Observations with respect to the circuit described herein indicate that it is able to detect signal in a noise environment where the noise levels substantially exceed the actual input signal being sensed and measured.

VERIFICATION

The circuit fed from 120° switch 82 performs a plurality of functions. When the signal sampled by switch 82 is noise only, the signal has an average value of plus 5 volts, the reference voltage established by capacitor 78 and resistor 76 and the reference voltage for the system. This signal is applied through resistor 158 to capacitor 160 but will be of substantially 0 net voltage.

Thus, the input to amplifier 162 is slightly negative by virtue of resistor 164. This holds the output of amplifier 162 appearing at conductor 166 negative also, thus producing the negative voltage discussed above in conductor 156 and holding transistors 150 off and 152 on. This negative voltage is also applied through resistor 168 to the base of transistor 170 which forms a part of the sweep generator 114 whereby the transistor 170 is held on. Current thus passes through transistor 170 and resistor 172 to charge capacitor 174 which forms the trigger circuit for a relaxation oscillator including trigger 176 to produce a gradual sweep voltage for the voltage control oscillator 134.

Capacitor 174 charges at a rate determined by resistor 172 until is aproaches the 5 volt reference. The trigger 176 like the VCO 134 and trigger 192 is an NE 555 timer and as will be understood, as the voltage appearing across capacitor 174 equals the voltage appearing at terminal 178 across capacitor 180, the integrated circuit trigger 176 fires rapidly discharging capacitor 196 toward ground through resistor 182. When the voltage across capacitor 174 equals about one-half of the voltage across capacitor 180, the trigger 176 turns off and capacitor 174 begins to recharge through resistor 172 and transistor 170. The period of sweep generator 176 is approximately 0.4 second and the ramp voltage appearing across capacitor 174 is applied to the base of the buffer transistor 182 and in turn applied through conductor 184 to the non-inverting input of operational amplifier 106. The output of integrating operational amplifier 122 is of course applied through conductor 128 to the inverting input.

The output of amplifier 106 appearing at conductor 130 is an amplified representation of the ramp voltage across capacitor 174. It will begin at a level somewhat negative relative to the 5 volt reference and charge to a level approximately equal to the 5 volt reference. This ramp voltage is applied to the base of transistor 132 to control the frequency of the oscillator 134 as already described above. As the base of transistor 132 goes negative the transistor conducts more reducing and effective resistance and shortening the time constant of the relaxation oscillator 134.

The ramp voltage appearing across capacitor 137 in the VCO is diagrammatically shown as curve D in FIG. 3 and the output of the VCO appearing at conductor 136 and providing the control pulses for the divide by 12 circuit 138 is shown as curve E in FIG. 3. As the ramp voltage appearing across capacitor 137 and shown in FIG. 3d approaches the voltage appearing across capacitor 188 which is internally biased to about 2 volts below the 5 volt reference, the integrated circuit timer 134 discharges capacitor 136 internally to ground and the charge cycle begins again.

The range of the relaxation oscillator 134 is dependent upon the voltage at the base of transistor 132 may have any frequency from 0 Hz when the base of transistor 132 is at about 5 volts up to a maximum of about 50 kHz or more when the voltage on the base of transistor 132 is about 2 volts below the plus 5 reference. For a higher speed range the upper frequency can be increased.

The description of the sweep generator 144 comprising generally the amplifier 162 and trigger 176 and associated components has been based on an assumption of a substantial 0 doppler signal and all noise input. The operation of the circuit is similar where the signal sample 100 as shown in FIG. 3a is either negative or includes a substantial negative and positive segment. However, when the sample 100 shown in FIG. 3a has shifted to an all positive segment of the complete periodic signal, the operation of the amplifier 162 produces a positive output corresponding to the charge on capacitor 160 through resistor 158 and this positive output at conductor 166 will turn on transistor 150 and turn off transistor 152 to provide the long time constant slow response and infinite D.C. gain already described.

The positive output at conductor 166 will also turn off transistor 170, terminating the flow of current through resistor 172, terminating any alteration of the charge on capacitor 174 and locking the sweep circuit at the level that it has reached at the time that conduction begins and the circuit locks up. Thereafter the output of integrating amplifier 122 will be the sole variable output to the operational amplifier 106 and in turn will control the precise phase of the VCO 134 and consequently maintain the phase locked relationship already described.

If the phase lock loop attempts to lock onto a harmonic, a simple analysis of FIG. 3a will show that the harmonic whether odd or even will produce a signal at the output of amplifier 162 which corresponds generally to a noise signal and will not have the polarity or magnitude required for disabling the sweep circuit 114. The time required to sweep the entire range of the phase lock system and the verification circuit 32 is roughly 0.3 second following the application of a reliable doppler system such as the 2,000 Hz (64 mph) signal described above. Most of this time is required for the sweep circuit to sweep the range to within the capture range of the AFC integrator 122 which operates very rapidly.

The resistor 157 and diode 159 provide a discharge path for capacitor 160 and thus a more rapid response of the circuit to a loss of signal than would be provided by resistor 158 and capacitor 160. This circuit improves the response of the circuit to any loss of doppler signal and speeds the return of the TC circuit 104 to the short time constant mode of operation to aid in reacquisition of a doppler signal.

The output of amplifier 162 at conductor 166 is also applied through resistor 190 to the trigger 192 which is also an NE 555 timer circuit. The low output on conductor 166 for non-locked operation keeps the output of trigger 192 appearing at conductor 194 high (at about 10 volts). Capacitor 196 is not charged in this mode as the diode 198 connected to the output 166 through resistor 200 is forward biased. However, when conductor 166 goes positive in response to a locked mode, capacitor 196 is charged through resistor 202. When the charge on capacitor 196 approaches 7 volts, trigger 192 fires discharging capacitor 196 through the trigger 192 and the output of trigger 192 appearing at conductor 194 goes low and remains low putting a low signal at terminal 60.

This low signal at terminal 60 indicates verification of a reliable doppler signal to the strobe and blanking circuit 46 of FIG. 1 whereby the strobe signal from time base 34 is transferred to the counter board 40 permitting the latches contained on the counter board to transfer the decade counter information to the three digital display tubes 62, 64 and 66. This is an indication to the rest of the doppler radar system that the VCO output at terminal 38, that is the VCO frequency divided by 12, is identical to the signal frequency at the switch 30 and the data can be processed and displayed.

If the operator wishes to hold a particular indication on the digital display 62, 64 and 66, he has a manual switch contained in lock switch and trigger circuit 68 which will effectively ground terminal 70 whereby diode 204 will prevent the application of a positive signal to the trigger 192 and thus will prevent a verification to be transmitted at terminal 60 to the strobe and blanking circuit 46. Thus, the output of strobe 46 through conductor 58 is disabled and cannot transfer data from the decade counters to the 7 segment decoders and displays as already displayed.

Some typical components utilized in the preferred embodiment of this invention are:

| Resistors | | | |
|---|---|---|---|
| 76 | 39 | K | ohms |
| 126 | 47 | K | ohms |
| 138 | 10 | K | ohms |
| 140 | 3.3 | K | ohms |
| 146 | 10 | K | ohms |
| 148 | 47 | | ohms |
| 154 | 10 | K | ohms |
| 157 | 47 | K | ohms |
| 158 | 27 | K | ohms |
| 164 | 47 | M | ohms |
| 168 | 10 | K | ohms |
| 172 | 27 | K | ohms |
| 182 | 10 | K | ohms |
| 190 | 27 | K | ohms |
| 200 | 1 | K | ohms |
| 202 | 1.8 | M | ohms |
| Capacitors | | | |
| 78 | .1 | | ufd |
| 136 | .0033 | | ufd |
| 142 | .1 | | ufd |
| 144 | 4 | | ufd |
| 160 | .1 | | ufd |
| 174 | 10 | | ufd |
| 180 | .1 | | ufd |
| 188 | .1 | | ufd |
| 196 | .1 | | ufd |

As will be clear from the foregoing description, the particular verification circuit and phase lock loop of this invention has unique advantages in providing noise immunity, freedom from harmonic ambiguity and an accurate means for measuring the frequency or period of a signal under test. The unique verification system is employed in conjunction with a doppler system, strobing and blanking system and counter system to provide a unique and improved doppler radar for use in traffic and similar operations.

What is claimed is.

1. Apparatus for synthesizing the frequency of an unknown periodic input signal which may be accompanied by noise comprising source means providing a periodic signal of variable frequency adapted for locked operation at a sample frequency which is a predetermined multiple of said input signal, first sample means responsive to said source means for providing a first sample of said input signal for a known time interval less than one half of the period of said input signal, control means generating a control signal having a level related to the magnitude and polarity of said first sample for relatively rapidly altering the frequency of said source means in response to said control signal, second sample means responsive to said source means for providing a second sample of said input signal for a predetermined time interval less than one half of the period of said input signal, sweep means generating a sweep signal which relatively slowly alters the frequency of said source means, and means responsive to an output of said second sample means to disable said sweep means when said output of said second sample means has a predetermined polarity.

2. The apparatus of claim 1 wherein said periodic signal is generally sinusoidal.

3. The apparatus of claim 2 wherein said known time interval is approximately one sixth of the period of said input signal.

4. The apparatus of claim 3 wherein said predetermined time interval is approximately one third of the period of said input signal and conterminous with said known time interval.

5. The apparatus of claim 4 wherein said sample frequency is automatically varied by said control signal and sweep signal to maintain said sample frequency at twelve times said input frequency.

6. The apparatus of claim 5 including rate means to alter the rate of response to changes in the magnitude or polarity of said first sample, said rate means being response to the magnitude and polarity of said second sample.

7. The apparatus of claim 6 wherein said control means comprises an operational amplifier having a capacitive feedback network, and said rate means comprises means to increase the effective capacitance of said feedback network wherever said second sample has a predetermined magnitude and polarity.

8. The apparatus of claim 5 including a counter which divides the output of said source into twelve substantially equal conterminous time intervals, said first sample comprising two of said intervals and said second sample comprising four of said intervals conterminous with said first sample.

9. In doppler radar apparatus for determining the speed of a vehicle the combination comprising:
input means for providing an input signal having a frequency related to the speed of such vehicle,
source means for generating a synthetic signal of variable controllable frequency,
gate means receiving said input signal,
control means energized from said gate means and controlling the frequency of said source means,
sampling means controlled by said source means to control said gate means whereby said gate means applies said input signal to said control means for intermittent periods with a duty cycle less than 50% to equate the periodicity of said synthetic signal to the periodicity of said input signal and eliminate harmonic ambiguities of said input signal,
digital counter and display means energized from said source means to generate a count related to the frequency of said source means, and
a timer means controlling the counting interval of said digital counter and display means whereby said count during said interval represents the speed of such vehicle.

10. The apparatus of claim 9 wherein said timer means is asynchronous and independent of said input signal and said source.

11. The apparatus of claim 9 wherein said source is a variable controlled oscillator having a frequency range at least twelve times the range of said input signal.

12. The apparatus of claim 9 including a parallel output digital counter driven from said source, said sampling means including said digital counter and opening said gate means in response to less than one half of said parallel output whereby said duty cycle is established.

13. The apparatus of claim 12 wherein said counter has at least six outputs, at least one output of which comprises a sample which controls said gate means and said control means adjusts said frequency so that the average value of said sample is maintained at a reference value.

14. The apparatus of claim 13 wherein two of said outputs conterminous with said one output control and second gate of said gate means and said control means adjusts said frequency in response to the gate signal from said second gate conterminously through a range whenever said gate signal is other than a predetermined magnitude and polarity.

15. The apparatus of claim 14 wherein said control means includes circuit means to provide rapid response to the output of said gate means whenever said source is out of synchronism with said input, and slow response whenever said gate signal indicates frequency synchronism.

16. The apparatus of claim 1 wherein the center time of said known time interval is in quadrature with the center time of said predetermined time interval.

17. The apparatus of claim 16 wherein said known time interval and said predetermined time interval are conterminous.

18. The apparatus of claim 16 wherein said control means alters said frequency to adjust said control signal to a predetermined reference level.

19. The apparatus of claim 18 wherein the sum of said known interval and said predetermined interval is no greater than one half of the period of said input signal.

* * * * *